EDWARD WAUD.

Improvement in Spark Arresters.

No. 4,433. Reissued June 20, 1871.

Witnesses,
J. C. Robbins
H. A. Daniels

E. Waud, Inventor,
by C. S. Whitman, Attorney

AM. PHOTO-LITHOGRAPHIC CO. N.Y. (OSBORNE'S PROCESS.)

UNITED STATES PATENT OFFICE.

EDWARD WAUD, FOR HIMSELF, AND BENJAMIN F. DORRIS, ASSIGNEE OF EDWARD WAUD, OF EUGENE CITY, OREGON.

IMPROVEMENT IN SPARK-ARRESTERS.

Specification forming part of Letters Patent No. 99,378, dated February 1, 1870; reissue No. 4,433, dated June 20, 1871.

*To all whom it may concern:*

Be it known that EDWARD WAUD, of Eugene City, in the State of Oregon, invented a new and Improved Spark-Arrester, whereof we, EDWARD WAUD and BENJAMIN F. DORRIS, are now owners by assignment; and we do hereby declare that the following is a full, clear, and exact description thereof, which will enable others skilled in the art to make and use the same, reference being had to the accompanying drawing forming part of this specification, in which—

Figure 1:
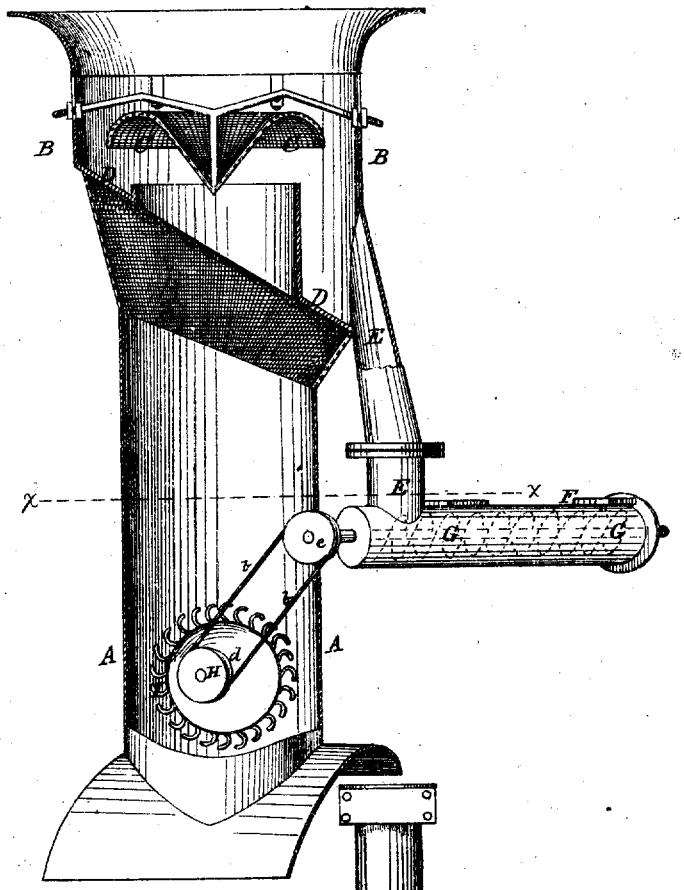
Figure 2:
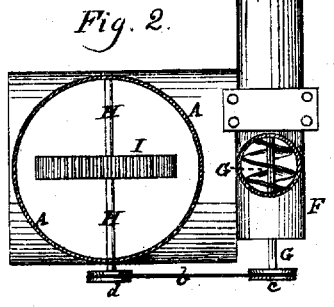

Figure 1 represents a vertical central section of our improved spark-arrester. Fig. 2 is a horizontal section of the same, the plan of section being indicated by the line *x x*, Fig. 1.

Similar letters of reference indicate corresponding parts.

This invention relates to a new attachment to the smoke-stacks of locomotive-engines, steam-boats, &c., and has for its object to prevent the escape of sparks from the smoke-stack. The invention consists in the combination of parts whereby the ashes and sparks are caught and collected in a tubular receptacle at one side of the stack, and are caused to be delivered by the ascending gases operating a wheel, as hereinafter set forth.

A in the drawing represents the lower part of a smoke-stack of suitable construction. B is the upper part of the smoke-stack. In it is suspended the perforated inverted cone C, which prevents the sparks from escaping through the upper end of the smoke-stack. Under the cone C is arranged, in the smoke-stack, an inclined annular plate, D, which has a projecting flange, *a*, around its inner edge, and which fits with its outer edge against the side of B, as shown. The lower end of the plate D is in communication with a tube, E, which conducts all sparks, ashes, and cinders which fall upon the plate D into a lower horizontal tube, F. This tube F guides all ashes, &c., that fall into it to the side of the engine or boat, and is, in order to facilitate the discharge of such matter, provided with a rotary worm, G, which forces all contents toward the discharge-end. The worm or screw G is revolved by means of a belt, *b*, which reaches around the pulleys *c d* of the shafts G H. The latter shaft is fitted through the lower part of the smoke-stack, and has a bucket-wheel, I, mounted upon it. The gases arising in the smoke-stack strike the buckets of the wheel I, and thereby revolve the same. The worm is thus rotated by the force of the ascending gases, and the cinders and ashes are gradually carried out. The worm G, instead of being driven by the bucket-wheel I, may be driven by a belt directly from the donkey-engine. In stationary steam-engines, saw-mills, &c., the pipe or tube E F may be continued down vertically, and may discharge the cinders, ashes, &c., into a well or other receptacle.

Having thus described this invention, we claim as new and desire to secure by Letters Patent—

1. The combination of the wheel I, revolved by the ascending gases, with the worm G, arranged substantially as shown and described, and for the purpose specified.

2. The combination of the horizontal tube F provided with a rotary worm, G, discharge-pipe E, inclined plate D provided with a flange, *a*, and inverted cam C, when operated together as described.

EDWARD WAUD.
BENJAMIN F. DORRIS.

Witnesses:
JOEL WARE,
G. B. DORRIS.